US008403232B2

(12) United States Patent
Park

(10) Patent No.: US 8,403,232 B2

(45) Date of Patent: Mar. 26, 2013

(54) COOKBOOK

(75) Inventor: Won Kyoung Park, Changwon (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 12/522,810

(22) PCT Filed: Nov. 15, 2007

(86) PCT No.: PCT/KR2007/005751

§ 371 (c)(1), (2), (4) Date: Jan. 6, 2010

(87) PCT Pub. No.: WO2008/084915

PCT Pub. Date: Jul. 17, 2008

(65) Prior Publication Data

US 2010/0123001 A1 May 20, 2010

(30) Foreign Application Priority Data

Jan. 11, 2007 (KR) ........................ 10-2007-0003280
Jan. 17, 2007 (KR) ........................ 10-2007-0005311

(51) Int. Cl.
*G06K 19/06* (2006.01)
*G06K 19/00* (2006.01)

(52) U.S. Cl. ........................................ 235/492; 235/487

(58) Field of Classification Search .................. 235/492, 235/487
See application file for complete search history.

(56) References Cited

U.S. PATENT DOCUMENTS 7,363,031 B1 4/2008 Aisa
7,579,954 B1 * 8/2009 Burkley ..................... 340/572.3
8,052,061 B2 * 11/2011 Warther ........................ 235/492
2002/0059175 A1 5/2002 Nakano
2002/0157411 A1 10/2002 Ishikawa et al.
2007/0182154 A1 * 8/2007 Hoeppner et al. .............. 283/72
2007/0195009 A1 * 8/2007 Yamamoto et al. ............ 345/1.1
2007/0208785 A1 * 9/2007 Hayashi et al. ............... 707/203
2008/0052178 A1 2/2008 Yamashita et al.
2009/0166428 A1 * 7/2009 Phillips et al. ................ 235/487

FOREIGN PATENT DOCUMENTS

CN 1662920 A 8/2005
JP 09-287743 A 11/1997
JP 2003-307313 A 10/2003
JP 2005-228146 A 8/2005

(Continued)

*Primary Examiner* — Jamara Franklin

(74) *Attorney, Agent, or Firm* — Birch, Stewart, Kolasch & Birch, LLP

(57) ABSTRACT

Provided is a food information providing system. The food information providing system includes a first RF tag, a second RF tag, a terminal, and a server. At least information of food is recorded in the first RF tag. At least spec information of a cooking appliance is recorded in the second RF tag. An RF reader is mounted in the terminal such that at least spec information of the cooking appliance and the food information are input from the first RF tag and the second RF tag. The server transmits operating information of the cooking appliance to the terminal with reference to the food information and the spec information of the cooking appliance transmitted from the terminal. Therefore, a user can obtain the latest information of food in real-time and can cook more conveniently by diversification of the range of food information provided to a user. Also, when sufficient information cannot be provided due to space limitation of books, the range of use for a book can be diversified to provide more information, thereby improving satisfaction of a purchaser of the book.

2 Claims, 4 Drawing Sheets

FOREIGN PATENT DOCUMENTS

| | | | |
|---|---|---|---|
| KR | 10-2005-028097 | A | 3/2005 |
| KR | 10-2005-0080409 | A | 8/2005 |
| WO | WO 01/28068 | A1 | 4/2001 |
| WO | WO-2004/003801 | A1 | 1/2004 |
| WO | WO 2006-006546 | A1 | 1/2006 |

* cited by examiner

Fig. 3
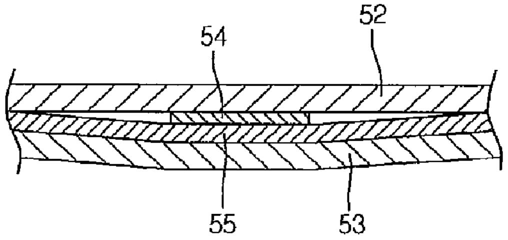
Fig. 4
| ADDRESS | FIELD NAME |
|---|---|
| 0 | START CODE |
| 1 | AUTHENTICATION CODE |
| 2 | LAYER INFORMATION OF FOOD |
| 3 | NETWORK ADDRESS INFORMATION |
| 4 | FOOD ID |
| 5 | ERROR CODE |
| 6 | END CODE |
Fig. 5
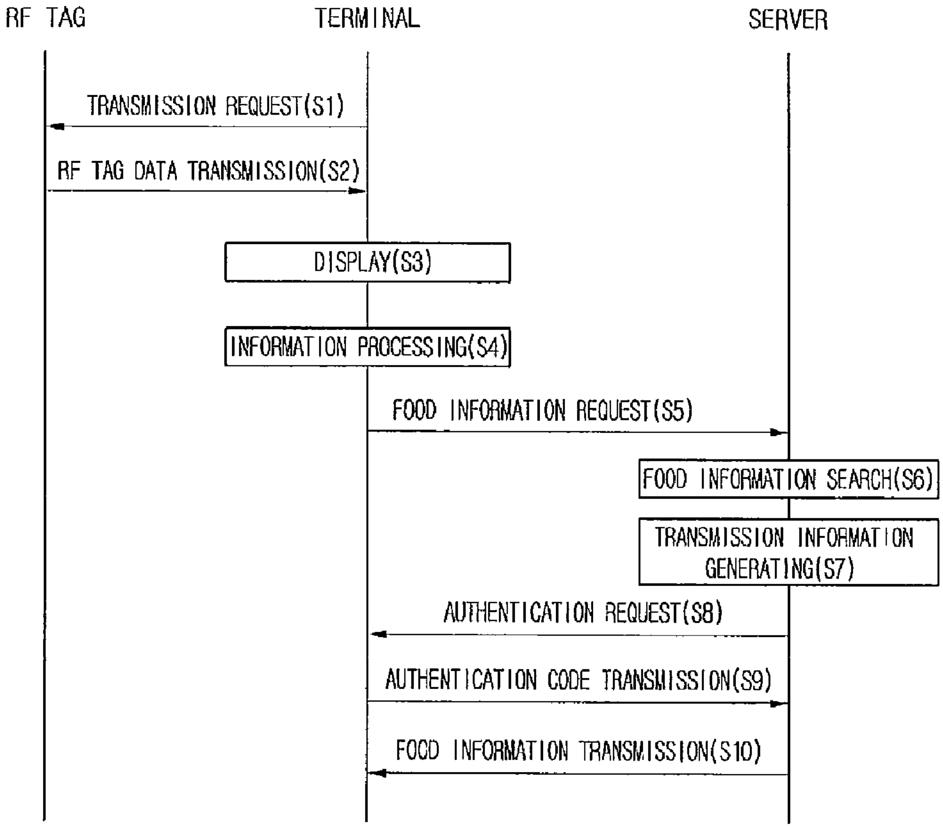

| ADDRESS | FIELD NAME |
|---|---|
| 0 | START CODE |
| 1 | AUTHENTICATION CODE |
| 2 | NETWORK ADDRESS INFORMATION |
| 3 | SPEC INFORMATION OF COOKING APPLIANCE |
| 4 | ERROR CODE |
| 5 | END CODE |

COOKBOOK

TECHNICAL FIELD

The present disclosure relates to a cookbook, food information providing system and method, and more particularly, to a system that enables a purchaser of a book to conveniently obtain food-related information.

BACKGROUND ART

A user usually cooks food based on experience. Alternatively, a user may learn a recipe from books to cook foods.

However, since the user obtains food information from limited resources, the obtained food information may not include specific information, such as preference for a food, conditions of a cooked food, or a specific example of cooking a food, due to space limitation of books. Therefore, in cooking with reference to books, a user may cook by guess because of insufficient information of the book.

A user may obtain food information through the Internet. However, a user may feel inconvenience because they should go to, e.g., a study far from the kitchen to learn a recipe through the Internet.

DISCLOSURE OF INVENTION

Technical Problem

Embodiments provide a cookbook, food information providing system and method that enable a user to obtain food-related information in real-time.

Embodiments also provide a cookbook, food information providing system and method that diversify the range of food information to enable a user to easily obtain various information related to foods.

Embodiments also provide a cookbook, food information providing system and method using the cookbook, which improve the range of use for the book to provide more information to a user when sufficient information cannot be provided due to space limitation, thereby increasing the satisfaction of a purchaser of the book.

Technical Solution

In one embodiment, a food information providing system include: at least one RF tag where at least network address information is recorded; a terminal where an RF reader module for reading information recorded in the RF tag is mounted; and a server connected to the terminal to provide food information to the terminal.

In another embodiment, a cookbook includes: a sheet; a food information display unit disposed on one surface of the sheet; an RF tag inserted into the sheet; and a conductor disposed on one surface of the RF tag such that information of the RF tag is not radiated.

In a further embodiment, a food information provision method includes: reading information recorded in an RF tag mounted in a sheet using a terminal, the RF tag being aligned with food information printed on one surface of the sheet; connecting a server to a network using the information of the RF tag; and downloading food information corresponding to the information of the RF tag from the server connected to the network.

In a still further embodiment, a food information providing system includes: an RF tag where at least network address information and information of a specific food are recorded; a terminal where an RF reader module for reading information recorded in the RF tag is mounted; and a server connected to the terminal to provide food information to the terminal.

In an even further embodiment, a food information providing system includes: a first RF tag where at least information of food is recorded; a second RF tag where at least spec information of a cooking appliance is recorded; a terminal where an RF reader is mounted such that at least spec information of the cooking appliance and the food information are input from the first RF tag and the second RF tag; and a server transmitting operating information of the cooking appliance to the terminal with reference to the food information and the spec information of the cooking appliance transmitted from the terminal.

Advantageous Effects

According to the present disclosure, a user can obtain the latest information of food in real-time and can cook more conveniently by diversification of the range of food information provided to a user. Also, when sufficient information cannot be provided due to space limitation of books, the range of use for a book can be diversified to provide more information, thereby improving satisfaction of a purchaser of the book.

BRIEF DESCRIPTION OF THE DRAWINGS

FIG. 3 is a cross-sectional view of one page of the cookbook taken along a line I-I' of FIG. 2 according to the first embodiment of the present disclosure.

FIG. 4 is a table of information included in a first RF tag according to the first embodiment of the present disclosure.

FIG. 5 is a flow chart illustrating a food information provision method according to the first embodiment of the present disclosure.

MODE FOR THE INVENTION

Reference will now be made in detail to the embodiments of the present disclosure, examples of which are illustrated in the accompanying drawings.

A food information providing system according to embodiments is configured as an RF tag reading system including an RF tag and an RF reader. In operation of the RF tag reading system, when a reader requests a tag to transmit tag data, the tag transmits tag data as a radio frequency (RF) to the reader. In the embodiments, the RF tag is provided in offline information medium such as books and the RF reader is provided in a terminal, however, the embodiments are not limited thereto.

<First Embodiment>

Figure 1:
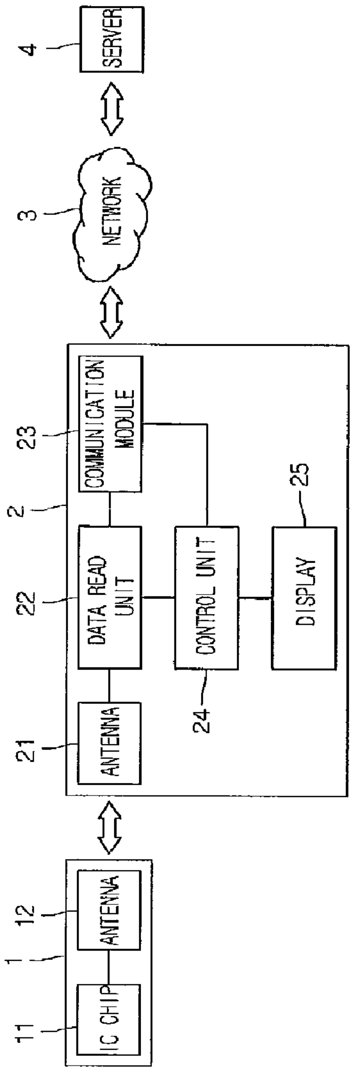
FIG. 1 is a structural view of a food information providing system according to a first embodiment of the present disclosure.

FIG. 1 is a structural view of a food information providing system according to a first embodiment of the present disclosure.

Referring to FIG. 1, the food information providing system includes an RF tag 1, a terminal 2, a server 4, and a network 3. information of a specific food is recorded in the RF tag 1. An RF reader system for reading food information recorded in the RF tag 1 is mounted in the terminal 2. The server 4 receives the food information from the terminal 2 to generate reply information. The network 3 connects the server 4 with the terminal 2.

Figure 2:
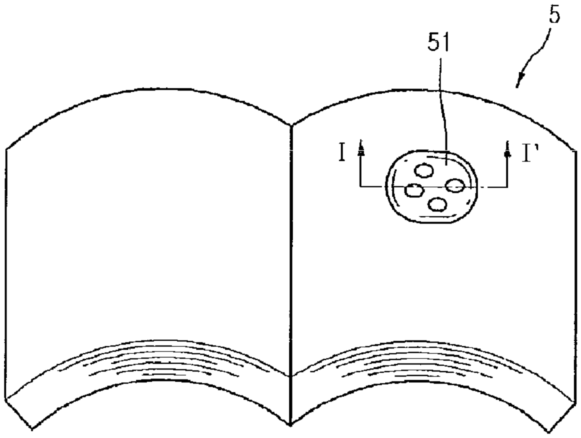
FIG. 2 is a perspective view of a cookbook according to the first embodiment of the present disclosure.

In detail, the RF tag 1 is provided in a cool book including a plurality of sheets. FIG. 2 is a perspective view of a cookbook, and FIG. 3 is a cross-sectional view of one page of the cookbook taken along a line of FIG. 2, according to the first embodiment of the present disclosure.

Referring to FIGS. 2 and 3, an image of a specific food is illustrated in a food information display unit 51 included in each page of a cookbook 5. Therefore, a user can see an image of a desired food through the food information display unit 51. An RF tag 54 is mounted inside a portion of a page that the food information display unit 51 is disposed.

A page of the cookbook 5, in particular the food information display unit 51, includes a first sheet 52, the RF tag 54, a conductor 55, and a second sheet 53. The first sheet 52 and the second sheet 53 form an upper surface and a lower surface of each page, respectively. Food information is recorded in the RF tag 54. The conductor 55 blocks the lower surface of the RF tag 54 to prevent a high frequency generated in the RF tag 54 from being transferred to the lower surface of the page.

In operation of the cookbook 5, since a provision disposition of the RF tag 54 is aligned with the food information display unit 51, a user can read the food information recorded in the RF tag 54 by bringing the terminal 2 close to the image of food.

The cookbook 5 includes a plurality of sheets. Therefore, when an RF reader is brought close to the RF tag 54, food information may be read from an RF tag mounted in a previous page. In order to prevent this, the conductor 55 is mounted under the RF tag 54 mounted in each page so as to read only information of the RF tag 54 mounted in a page designated by a user. The RF tag 54 mounted in any one page radiates a high frequency in only an upward direction due to the conductor 55. The RF tag 54 mounted in a page after the page desired by a user is blocked by the conductor 55 of the current page.

A user can always read information of an image of a desired food included in a desired page by means of the configuration of the cookbook 5.

Referring to FIG. 1, again, the RF tag 1 includes an IC chip 11 and an antenna 12. At least information related to food is recorded in the IC chip 11. The antenna 12 radiates the information recorded in the IC chip 11 as a high frequency. Power may be received from the terminal 2 through the antenna 12.

The terminal 2 includes an antenna 21 that exchanges a high frequency signal with the RF tag 1 and a data read unit 22 that processes information received through the antenna 21. Since the antenna 21 and the data read unit 22 serve as an RF reader, they, as a whole, may be referred to as an RF reader module. The terminal 2 further includes a control unit 24 that entirely controls a system of the terminal 2, a display 25 that displays the condition and other information of the terminal 2, and a communication module 23 that allows the terminal 2 to communicates with other external system.

The communication module 23 is connected to the server 4 through the network 3 to exchange data with the server 4.

Hereinafter, an operation of the food information providing system will be described.

At least information related to food is included in the IC chip 11 of the RF tag 1, and the information is transmitted to the terminal 2 through the antenna 12. Here, since the RF tag is aligned with the food information display unit 51 of the cookbook 5, a user can easily read the desired food information.

The information included in the RF tag 1 is illustrated in FIG. 4.

Referring to FIG. 4, a start code field includes a code representing start of data and an end code field includes a code representing end of data. An authentication code field includes an authentication code of the terminal 2 reading information and a code used for authentication of the RF tag 1 in the server 4. An error code field includes a code for detecting generation of error in data transmission. Each field includes a code fundamentally necessary for an operation of an RF tag reading system and may be changed depending on specific conditions.

Besides the above-mentioned information, the RF tag of the food information providing system includes layer information of food, address information of a network where the server 4 is located, and a food ID in respective address.

In detail, the layer information of food is configured as a plurality of layers that have a lower menu. For example, when the food is a Western food, the layer is represented as [0002], when the Western food is a pizza, the layer is represented as [0001], when the Pizza is a pan pizza, the layer is represented as [0002], and when the pan pizza is a vegetable pizza, the layer is represented as [0001]. As a result, the layer information includes information having layers of [0002/0001/0002/0001]. The address information of a network where the server 4 is located may be an IP address. The server 4 may be a server of a publishing company that provides the cookbook 5 and may provide an additional service to a purchaser of the cookbook 5. Here, the network 3 includes both of wired/wireless networks and may be an Internet network in the case of the wired network. The network 3 may be connected to a server installed in a home as address information of a home network. Address information of the wireless network may be applied to a wireless Internet when the terminal is a terminal such as a cellular phone and the like.

The food ID may be represented as a name such as [a vegetable pan pizza] that directly represents a name of the food and combination of numbers such as [12345678] as an abbreviated number that allows the name to be easily recognized by the server and combination of other codes.

Referring to FIG. 1, again, information transmitted to the terminal 2 is read by the data read unit 22 and then is transmitted to the outside through the communication module 23. In detail, the information is controlled by the control unit 24 of the terminal 2 and is transmitted to the server 4 through the network 3.

The information transmitted to the server 4 is recognized as a specific food by various methods and then information related to the specific food is collected. The collected information is transmitted to the terminal 2 through the network 3, and the transmitted information is displayed on the display 25. Although not shown, the transmitted information may be output as sound information through a speaker.

When the food information is output on the display 25, a user may obtain additional information of the corresponding food with reference to the output information. For example, a user may obtain information of other food related to the corresponding food, a recipe suitable for an oven of a specific type, and information of a moving picture about cooking food, or information of preferences of other people for the specific food.

As described above, a user can obtain food information in real-time, and thus can obtain the latest food information more exactly and can diversify the range of food information to easily obtain various food information. In addition, if sufficient information cannot be provided due to space limitation of books, more information can be provided by diversifying the range of use for a book.

FIG. 5 is a flow chart illustrating a food information provision method according to the first embodiment of the present disclosure.

Referring to FIG. 5, a user brings the terminal 2 close to a specific position of the cookbook 5 where the RF tag 1 is mounted in order to obtain additional information of a specific food. Then, the terminal 2 requests the RF tag 1 to transmit information recorded in the RF tag 1 (S1). Here, if the RF tag 1 manually operates, power may be applied thereto.

The RF tag 1 transmits the information recorded therein to the terminal 2 in response to the transmission request (S2). The RF tag 1 may transmit data only after authentication for the terminal 2.

After receiving data from the RF tag 1, the terminal 2 displays the information of the food (S3). Here, the displayed information may include a food ID such as [a vegetable pan pizza], layer information of the food, address information of a network where the server 4 is located, or the like. A user processes the displayed information (S5) and requests the server 4 for food information (S5). Here, the processing of the information (S5) may be agreed between the terminal 2 and the server 4 operated by a fabrication company for a cookbook. For example, it may be predetermined that layer information of food is filled in a specific transmission field and is transmitted to the server 4.

The server 4 requested for transmission of food information searches for information of the corresponding food therein or collects information from an external system (S6) to generate information to be directly transmitted (S7). Here, the generated information, as described above, may include information of other food related to the requested food, for example, a bulgogi pizza, if information of a vegetable pizza is transmitted, information of a recipe of a vegetable pizza using a specific oven, information of a moving picture about a detailed cooking process, preferences of other users about a vegetable pizza cooked by a recipe introduced in a cookbook, or the like.

The server 4, before providing food information to the terminal 2, requests the terminal 2 for authentication information for determining whether or not the terminal or the cookbook is authenticated (S8). The terminal 2 requested for the authentication information transmits an authentication code (S9). The authentication code may be information that is received from the RF tag 1 to the terminal 2.

When the authentication code is received and it is confirmed that the terminal or the cookbook is authenticated, the generated food information is transmitted from the server 4 to the terminal 2 (S10).

The transmitted information is display on the terminal 2 or represented as sound, and a user can obtain additional information of the food therethrough.

The first embodiment may further include the following modified examples.

The food information display unit 51 may be configured as an image, however, should not be limited thereto and may be configured as letters. In the case of letters, a sentence such as "Place the terminal here" for designating a position to apply an RF reader may be further provided. However, an image of food may be provided to improve the recognizability of a user.

In the first embodiment, the cookbook 5 has a shape of commonly used book, that is, is configured as a plurality of sheets adhered together to hinge at one side using adhesives. However, the cookbook should not be limited thereto and may be formed by binding punched sheets with a ring.

In addition, the request of authentication from the server 4 to the terminal 2 (S8) and the transmission of the authentication code (S9) should be performed between the request of food information from the terminal 2 to the server 4 and the transmission of the food information from the server 4 to the terminal 2, however, the specific order does not matter.

<Second Embodiment>

The first embodiment provides a recipe of a specific food introduced in a food-related book. However, if a user has a cooking appliance with a different operating condition from a recipe of a specific food introduced in a cookbook, the food cannot be made on the best condition. For example, if a user's cooking appliance can output power of up to 3000 W while a cookbook introduce cooking for 30 minutes using a cooking appliance with power of 4000 W, a user will be confused about a recipe.

A second embodiment can be applied to this case. The elements illustrated in the first embodiment is to the same in the second embodiment, and thus descriptions thereof will not be given and refer to descriptions illustrated in the first embodiment.

Figures 6, 7:
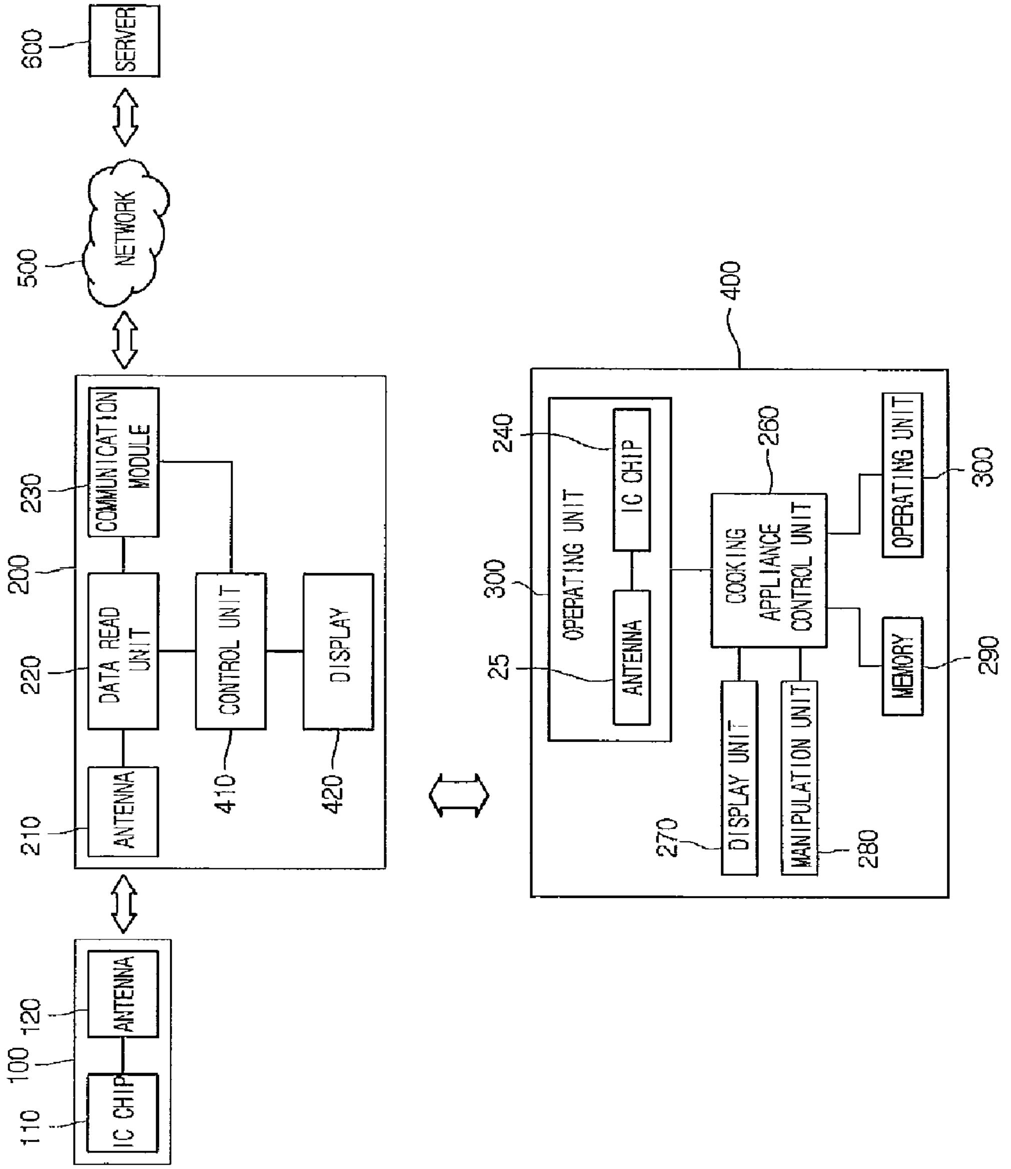
FIG. 6 is a structural view of a food information providing system according to a second embodiment of the present disclosure.
FIG. 7 is a table of information included in a second RF tag according to the second embodiment of the present disclosure.

FIG. 6 is a structural view of a food information providing system according to a second embodiment of the present disclosure.

Referring to FIG. 6, the food information providing system includes a first RF tag 100, a second RF tag 300, a terminal 200, a server 600, and a network 500. Information related to a specific food is recorded in the first RF tag 100. Spec information of a cooking appliance 400, e.g., an oven, is recorded in the second RF tag 300. An RF reader system is mounted in the terminal 200 to read the food information and the spec information of the cooking appliance recorded in the first and second RF tags 100 and 300, respectively. The server 600 receives the food information from the terminal 200 to generate reply information. The network 500 connects the server 600 to the terminal 200.

Hereinafter, an operation the food information providing system will be described. The terminal 200 reads food information from the first RF tag 100 and reads the spec information of the cooking appliance from the second RF tag 300. The food information and the spec information are transmitted to the server 600 through the network 500. The server 600 searches for the best recipe for a user with reference to the spec information of the cooking appliance. Thereafter, the best recipe is transmitted to the terminal 200 and a user can operate the cooking appliance using the transmitted best recipe.

Hereinafter, each component of the food information providing system will be described in detail.

The first RF tag 100 is provided in a cookbook including a plurality of sheets. The configuration and operation of the cookbook are described in the first embodiment, and thus specific description thereof will not be given.

The first RF tag 100 includes an IC chip 110 where at least food information is recorded and an antenna 120 that radiates the information recorded in the IC chip 110 as a high frequency. Of course, power may be applied from the terminal 200 through the antenna 120.

In addition, the second RF tag 300 is provided in the cooking appliance 400. The cooking appliance 400 further includes a cooking appliance control unit 260, a manipulation unit 280, a display unit 270, a memory 290, and an operating unit 300 for operating the cooking appliance 400 itself. A user operates the cooking appliance using the manipulation unit 280 and the display unit 270 displays an operating condition of the cooking appliance 400. The memory 290 stores various information necessary for an operation of the cooking appliance 400 and the operating unit 300 includes various kinds of devices, e.g., a heater.

The terminal 200 includes an antenna 210 for communicating a high frequency between the first and second RF tags 100 and 300 and a data read unit 220 for processing information received through the antenna 210. Since the antenna 210 and the data read unit 220 serve as an RF reader, they, as a whole, may be referred to as an RF reader module. The terminal 200 further includes a control unit 410 that entirely controls a system of the terminal 200, a display 420 that displays the condition and other information of the terminal 200, and a communication module 230 that allows the terminal 200 to communicates with other external system.

The communication module 230 is connected to the server 400 through the network 300 to exchange data with the server 400.

Hereinafter, an operation of the food information providing system will be described.

At least information related to food is included in the IC chip 110 of the first RF tag 100, and the information is transmitted to the terminal 200 through the antenna 120. The information recorded in the IC chip 110 is described in the first embodiment, and thus specific description thereof will not be given. Here, since the first RF tag 100 is aligned with the food information display unit of a cookbook, a user can easily read the desired food information.

The information included in the second RF tag 300 is illustrated in FIG. 7.

Referring to FIG. 7, a start code field, an end code field, an authentication code field, and an error code field are included in the second RF tag 300. Each field includes a code fundamentally necessary for an operation of an RF tag reading system and may be changed depending on specific conditions.

Besides the above-mentioned information, the second RF tag 300 includes spec information of a cooking appliance and a network address information. The spec information may include information that is recognizable by only a production company of the cooking appliance, for example, [oven0203], as an ID for allowing the production company to recognize a specific cooking appliance. The spec information may further include installation information of a heater mounted in the cooking appliance, power information of the heater, an inner capacity of a cavity, or the like.

The spec information may include information for recognizing a cooking appliance of a user. The network address information may include address information of a network where the server 600 is located.

Referring to FIG. 6, again, information transmitted from the first and second RF tags 100 and 300 to the terminal 200 is read by the data read unit 220 and then is transmitted to the outside by the communication module 230. In detail, the information is controlled by the control unit 240 of the terminal 200 and is transmitted to the server 600 through the network 500.

The information transmitted to the server 600 is recognized as a specific food by various methods and then information related to the specific food is collected. The collected information is transmitted to the terminal 200 through the network 500, and the transmitted information is displayed on the display 420. Although not shown, the transmitted information may be output as sound information through a speaker.

When the food information is output on the display 420, a user may obtain additional information of the corresponding food with reference to the output information. For example, a user may obtain information of other food related to the corresponding food, a recipe suitable for an oven of a specific type, and information of a moving picture of cooking food, or information of preferences of other people about the specific food.

As described above, a user can obtain food information in real-time, and thus can obtain the latest food information more exactly and can diversify the range of food information to easily obtain various food information. In addition, when sufficient information cannot be provided due to space limitation of books, more information can be provided by diversifying the range of use for a book and the best recipe can be provided for the cooking appliance used for cooking a food selected by a user.

Figure 8:
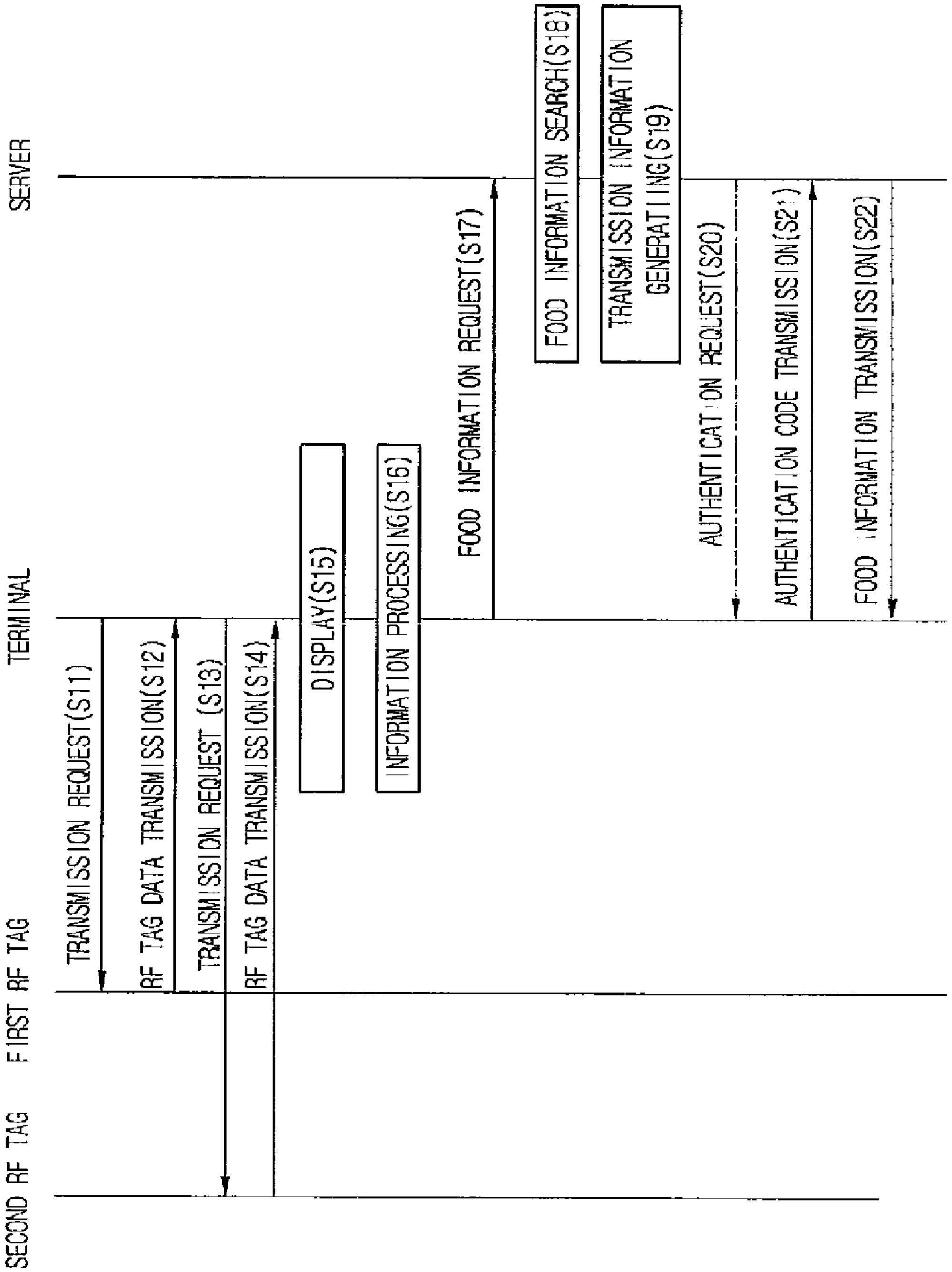
FIG. 8 is a flow chart illustrating a food information provision method according to the second embodiment of the present disclosure.

FIG. 8 is a flow chart illustrating a food information provision method according to the second embodiment of the present disclosure.

Referring to FIG. 8, a user brings a terminal 200 close to a specific position of a cookbook where a first RF tag 100 is mounted in order to obtain additional information of food. Then, the terminal 200 requests the first RF tag 100 to transmit information recorded in the first RF tag 100 (S11). Here, if the first RF tag 100 operates manually, power may be applied thereto.

The first RF tag 100 transmits the information recorded therein to the terminal 200 in response to the transmission request (S12). The first RF tag 100 may transmit information of only after authentication for the terminal 200.

The terminal 200 is brought close to a portion of the specific cooking appliance where the second RF tag 300 is mounted in order to obtain spec information of the cooking appliance. Then, the terminal 200 requests the second RF tag 300 for transmission of information recorded therein (S13). Here, if the second RF tag 300 operates manually, power may be applied thereto. The second RF tag 300 transmits the information to the terminal 200 in response to the request of transmission (S14). Here, the authentication may be performed, too.

The terminal 200 displays the data received from the first and second RF tags 100 and 300 (S15). Here, the displayed information may be the information transmitted from the first RF tag 100 and may include a food ID, e.g., [a vegetable pan pizza], layer information of the food, or layer information of the food, address information of a network where the server 600 is located, or the like. Of course, spec information of a cooking appliance and address information of a network where the server 600 is located, which are provided from the second RF tag 300, may be displayed, too.

When the information is displayed, a user may select network address information transmitted from the second RF tag 300 mounted in the cooking appliance or network address information transmitted from the first RF tag 100. Here, although a user uses either of a server of a publishing company for a cookbook or a server of a fabrication company for a cooking appliance, a user can sufficient information, and thus a user can simultaneously various information from the servers of the two companies. Besides, various selections may be made according to predetermined methods between the server 600 and the terminal 200.

A user processes the displayed information (S16) to request the server 600 for food information (S17).

The server 600 requested for transmission of food information searches for information of the corresponding food therein or collects data from an external system, for example, a server of a production company of a cooking appliance in the case of a server of a publishing company, and a server of a publishing company in the case of a server of a production company of a cooking appliance, (S18) to generate information to be directly transmitted (S19). Here, the generated information, as described above, may include information of other food related to the requested food, for example, a bulgogi pizza, if information of a vegetable pizza is transmitted, information of the best recipe of making a vegetable pizza using a cooking appliance of a user, information of a moving picture of a detailed cooking process, preferences of other users about a vegetable pizza cooked by a recipe introduced in a cookbook, or the like.

The server 600, before providing food information to the terminal 200, requests the terminal 200 for authentication information for determining whether or not the terminal or the cookbook is authenticated (S20). The terminal 200 requested for the authentication information transmits an authentication code (S21). The authentication code may include information received from the first RF tag 100 or the second RF tag 300.

When the authentication code is received and it is confirmed that the terminal or the cookbook is authenticated, the generated food information is transmitted from the server 600 to the terminal 200 (S22).

The transmitted information is display on the terminal 200 or represented as sound, and a user can obtain additional information of the food therethrough. Here, manipulating information of a cooking appliance is obtained, and a user can operate the cooking appliance on the best condition for cooking the food.

The second embodiment may further include the following modified examples.

The request of authentication from the server 600 to the terminal 200 (S20) and the transmission of the authentication code (S21) should be performed between the request of food information from the terminal 200 to the server 600 (S17) and the transmission of the food information from the server 600 to the terminal 200 (S22), however, the specific order does not matter.

In addition, network address information is included in both of the first and second RF tags 100 and 300, however, the second embodiment should not be limited thereto, and the network address information of a server may not be provided in any one of the first and second RF tags 100 and 300.

Industrial Applicability

According to the present disclosure, a user can obtain the latest information of food in real-time and can cook more conveniently by diversification of the range of food information provided to a user. Also, when sufficient information cannot be provided due to space limitation of books, the range of use for a book can be diversified to provide more information, thereby improving satisfaction of a purchaser of the book. In addition, a user that does not know how to use a cooking appliance for cooking a specific food can easily operate the cooking appliance.

The invention claimed is:

1. A cookbook comprising:

a first sheet defining an upper surface of a page;

a second sheet defining a lower surface of the page;

a food information display unit disposed on the upper surface of the page and comprising an image of a specific food;

a radio frequency tag inserted between the first sheet and the second sheet and recording information of the specific food; and a shielding member disposed between the second sheet and the radio frequency tag to block the lower surface of the radio frequency tag to prevent a high frequency generated in the radio frequency tag from being transferred to the lower surface of the page.

2. The cookbook according to claim 1, wherein the radio frequency tag is aligned with the food information display unit.

* * * * *